US00RE49075E

(19) United States
(12) Reissued Patent
Zamir

(10) Patent Number: US RE49,075 E
(45) Date of Reissued Patent: May 17, 2022

(54) TEMPERATURE CONTROL SYSTEM

(71) Applicant: DZSOLAR LTD, Richmond (GB)

(72) Inventor: Ofri Zamir, Hogla (IL)

(73) Assignee: DZSOLAR LTD, Richmond (GB)

(21) Appl. No.: 16/692,576

(22) Filed: Nov. 22, 2019

Related U.S. Patent Documents

Reissue of:
(64) Patent No.: 9,267,713
Issued: Feb. 23, 2016
Appl. No.: 13/502,923
PCT Filed: Oct. 20, 2010
PCT No.: PCT/IL2010/000863
§ 371 (c)(1),
(2) Date: Apr. 19, 2012
PCT Pub. No.: WO2011/048594
PCT Pub. Date: Apr. 28, 2011

U.S. Applications:
(60) Provisional application No. 61/253,573, filed on Oct. 21, 2009.

(51) Int. Cl.
*F25B 13/00* (2006.01)
*F25B 27/00* (2006.01)
*B60H 1/00* (2006.01)

(52) U.S. Cl.
CPC ..... *F25B 13/00* (2013.01); *B60H 1/00428* (2013.01); *F25B 27/005* (2013.01); *F25B 2313/008* (2013.01); *F25B 2313/0272* (2013.01); *F25B 2400/01* (2013.01); *F25B 2400/04* (2013.01); *F25B 2600/0253* (2013.01);

(Continued)

(58) Field of Classification Search
CPC .... B60H 1/00428; F25B 27/005; F25B 13/00; F25B 2400/01; F25B 2400/04; F25B 2600/0253; F25B 2313/0272; F25B 2313/008; Y02B 30/70; Y02T 10/88; Y10T 137/87249
See application file for complete search history.

(56) References Cited

U.S. PATENT DOCUMENTS 2,753,693 A 7/1956 Zearfoss, Jr.
2,758,447 A 8/1956 Prosek
(Continued)

FOREIGN PATENT DOCUMENTS

AU 2011100888 A4 2/2012
CN 2679562 Y 2/2005
(Continued)

OTHER PUBLICATIONS

Petition for Inter Partes Review of U.S. Pat. No. 9,267,713; 66 pages; filed Aug. 13, 2019.
(Continued)

*Primary Examiner* — William C Doerrler
(74) *Attorney, Agent, or Firm* — Vorys, Sater, Seymour and Pease LLP; Anthony Venturino

(57) ABSTRACT

A temperature control system, including a closed refrigerant circuit having an evaporator unit for absorbing heat via the refrigerant, thereby evaporating it, a compressor unit with a mechanical compressor for increasing the pressure of the refrigerant and a thermal collector for using an external heat source to increase the temperature of refrigerant within the circuit, and a condenser unit for rejecting heat from the refrigerant, liquefying it.

9 Claims, 4 Drawing Sheets

(52) U.S. Cl.
CPC ..... *Y02B 30/70* (2013.01); *Y02T 10/88* (2013.01); *Y10T 137/87249* (2015.04)

(56) References Cited

U.S. PATENT DOCUMENTS

| | | | | | |
|---|---|---|---|---|---|
| 3,916,871 | A * | 11/1975 | Estes | F24S 80/54 126/666 |
| 4,111,188 | A | 9/1978 | Murphy, Jr. | |
| 4,138,997 | A | 2/1979 | LaPorte et al. | |
| 4,164,932 | A | 8/1979 | Gavin | |
| 4,165,037 | A * | 8/1979 | McCarson | F24F 3/001 237/1 R |
| 4,217,881 | A | 8/1980 | Brent | |
| 4,256,475 | A * | 3/1981 | Schafer | 62/235.1 |
| 4,285,208 | A * | 8/1981 | Takeshita et al. | 62/141 |
| 4,401,155 | A | 8/1983 | Royal et al. | |
| 4,672,949 | A | 6/1987 | O'Neill | |
| 5,177,977 | A | 1/1993 | Larsen | |
| 5,261,251 | A * | 11/1993 | Galiyano | 62/176.6 |
| 7,451,611 | B2 * | 11/2008 | Muscatell | 62/235.1 |
| 8,613,204 | B2 * | 12/2013 | Farmer | 62/235.1 |
| 2006/0288720 | A1 | 12/2006 | Jmaev | |
| 2007/0032909 | A1 * | 2/2007 | Tolbert | F25B 49/025 700/276 |
| 2009/0032760 | A1 | 2/2009 | Muscatell | |
| 2010/0031953 | A1 * | 2/2010 | Penev | F24D 19/106 126/615 |
| 2011/0219801 | A1 * | 9/2011 | McKenzie | 62/235.1 |
| 2012/0131941 | A1 * | 5/2012 | Ackner et al. | 62/235.1 |
| 2012/0247134 | A1 * | 10/2012 | Gurin | 62/129 |
| 2012/0312043 | A1 * | 12/2012 | Kim et al. | 62/235.1 |
| 2013/0255299 | A1 * | 10/2013 | Hammond | 62/235.1 |

FOREIGN PATENT DOCUMENTS

| | | | |
|---|---|---|---|
| DE | 2636055 | A1 | 2/1978 |
| DE | 10 2009 004 501 | B4 | 12/2012 |
| EP | 1 176 373 | A1 | 1/2002 |
| EP | 1176373 | * | 1/2002 |
| EP | 1 925 892 | A2 | 5/2008 |
| JP | 54-159454 | U | 11/1979 |
| JP | 56-168058 | A | 12/1981 |
| JP | 57-156762 | U | 10/1982 |
| JP | 58-85064 | A | 5/1983 |
| JP | 58-107478 | U | 7/1983 |
| JP | 58-127070 | A | 7/1983 |
| JP | 10-267416 | A | 10/1998 |
| JP | 2003-188320 | A | 7/2003 |
| JP | 2007-333364 | A | 12/2007 |
| JP | 2009-16475 | A | 1/2009 |
| JP | 2009-109141 | A | 5/2009 |
| WO | 2009/064760 | A1 | 5/2009 |

OTHER PUBLICATIONS

European Office Action for EP2491319 corresponding to U.S. Pat. No. 9,267,713; 15 pages; dated Apr. 16, 2019.

Australian Office Action for AU2010309437 corresponding to U.S. Pat. No. 9,267,713; 4 pages; dated Nov. 13, 2015.

Certified English Translation of Melidis, EP Patent Application 1176373; 16 pages; published Jan. 30, 2002.

"Solar Engineering of Thermal Processes," J.A. Duffie & W.A. Beckman, 4th Edition, Wiley, 2013, p. 277, reference is made to "the first evacuated tubular collector was built by Speyer (1965)."

Principles of Solar Engineering, F. Kreith & J.F. Kreider, 1978, Hemisphere Publishing Corporation, pp. 165-169.

"Optimization and thermal degradation study of black nickel solar collector coatings," Patel et al., Solar Energy Materials, vol. 11, pp. 381-399 (1985).

Refrigeration and Air Conditioning, 2nd Edition, W.F. Stoecker & J.W. Jones, McGraw-Hill, Inc., pp. 351-352 (1982).

Declaration of Professor Patrick Phelan (with attached Curriculum Vitae), 21 pages, dated Aug. 12, 2019.

Declaration of Professor Peiwen "Perry" Li (with attached Curriculum Vitae), 39 pages, dated Aug. 12, 2019.

International Search Report for International Application No. PCT/IL2010/000863, three pages, dated May 12, 2011.

* cited by examiner

TEMPERATURE CONTROL SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This is a National Phase Application filed under 35 U.S.C. § 371 as a national stage of PCT/IL2010/000863, filed on Oct. 20, 2010, an application claiming the benefit under 35 U.S.C. § 119(e) of U.S. Provisional Application No. 61/253,573, filed on Oct. 21, 2009, the content of each of which is hereby incorporated by reference in their entirety.

FIELD OF THE INVENTION

This invention relates to air-conditioning systems, and in particular to those which provide cooling and/or heating by compressing a working fluid such as a refrigerant.

BACKGROUND OF THE INVENTION

Air-conditioning systems are commonly provided to provide heating and cooling to a space. A compressor unit is provided to compress and thereby heat refrigerant which is provided thereto in a gaseous state. The compressed a heated refrigerant is passed through condenser coils, where air is forced over them to release heat into the atmosphere, thereby condensing the refrigerant to liquid form. The liquid refrigerant may pass through a metering device, which regulates the flow of refrigerant while lowering its pressure, then entering an evaporator, which is located in or near a space to be cooled. Air from the space is forced over evaporator coils, which causes heat from the space to be absorbed by the refrigerant, which becomes a gas. The gaseous refrigerant is then carried to the compressor unit, where the cycle starts again.

To provide heating, the direction of flow is reversed. A reversing valve is provided in order to ensure that the direction of flow through the compressor unit remains the same as when cooling.

SUMMARY OF THE INVENTION

According to one aspect of the present invention, there is provided a temperature control system comprising a closed refrigerant circuit having:

an evaporator unit configured for absorbing heat via the refrigerant, thereby evaporating it;

a compressor unit configured for increasing the pressure and temperature of refrigerant within the circuit; an a condenser unit configured for rejecting heat from the refrigerant, thereby liquefying it;

the compressor unit comprising a mechanical compressor configured for increasing the pressure of the refrigerant and a thermal collector configured for utilizing an external heat source to increase the temperature of the refrigerant.

The thermal collector may comprise a solar collector configured for capturing heat from incident solar radiation.

The solar-sensitive modules may comprise a photovoltaic cell.

The thermal collector may be arranged downstream of the mechanical compressor.

A second thermal collector may be provided, arranged upstream of the mechanical compressor.

Each of the thermal collectors may be provided with a bypass configured to allow the refrigerant to bypass it.

The temperature control system may further comprise a controller configured to control the operation of the mechanical compressor at least based on an expected temperature increase of the refrigerant in the thermal collector.

The compressor unit may comprise a variable-frequency drive to vary the speed of the mechanical compressor.

The controller may be configured to control the operation of the mechanical compressor at least by causing the variable-frequency drive to vary the speed of the mechanical compressor.

The temperature control system may further comprise temperature sensors disposed so as to measure the temperature of the refrigerant upon entering and exiting the thermal collector, the controller being configured to determine the expected temperature increase based on the temperature measured by the temperature sensors.

The temperature control system may further comprise one or more solar-sensitive modules configured to measure the degree of solar radiation available to the solar collector, the controller being configured to determine the expected temperature increase based on the degree of solar radiation measured by the solar-sensitive modules.

The solar collector may comprise a refrigerant-carrying conduit within an enclosure, which may be evacuated, a radiation-facing side of the enclosure comprising a transparent material.

The refrigerant-carrying conduit may constitute a portion of a fin-tube arrangement.

The solar collector may further comprise a heat-sink associated with the refrigerant-carrying conduit, the heat-sink being configured to absorb solar energy and transfer it to the refrigerant-carrying conduit. The heat-sink may be formed with at least a portion of the refrigerant-carrying conduit, and/or it may be formed so as to receive at least a portion of the refrigerant-carrying conduit therewithin.

The heat-sink may be formed with projections extending radially from the refrigerant-carrying conduit. The projections may extend along a portion of the refrigerant-carrying conduit.

The heat-sink may be made of an extruded material.

The heat-sink may be made of a metal.

At least radiation-facing surfaces of the heat-sink may be designed to lower reflectivity thereof.

The temperature control system may be configured to operate a vapor-configuration refrigeration cycle.

The temperature control system may further comprise a metering device, such as a thermostatic expansion valve, downstream of the condenser unit configured for regulating the flow of liquid refrigerant.

The temperature control system may be a split-system air conditioning system.

The temperature control system may further comprise a reversing valve configured to cause the refrigerant to flow in a reverse direction, thereby enabling the evaporator unit to reject heat from the refrigerant, and the condenser unit to absorb heat to the refrigerant, i.e., to cause heat to be absorbed thereby.

The condenser unit may constitute a portion of a water heating system, the water heater being configured to utilize the heat rejected from the refrigerant to heat water. At least a portion of the condenser my constitute part of a heat exchanger in order to enable the heating of the water.

According to another aspect of the present invention, there is provided a reversing valve comprising first and second supply connections, and inlet, an outlet, and first and second valves; the reversing valve being arranged such that the first and second valves are configured to selectively:

bring the first supply connection in fluid communication with the inlet and fluid isolation from the outlet, and the second supply connection in fluid isolation from the inlet and fluid communication with the outlet; or bring the second supply connection in fluid communication with the inlet and fluid isolation from the outlet, and the first supply connection in fluid isolation from the inlet and fluid communication with the outlet.

The first and second valves may be three three-way valves, each comprising first, second, and third ports, and being configured such that the second port may be brought into fluid communication with only one of the first and third ports.

The valves may be connected such that:

first ports of each valve are in fluid communication with each other and with the first supply connection;

third ports of each valve are in fluid communication with each other and with the second supply connection;

the second port of the first valve is in fluid communication with the inlet; and the second port of the second valve is in fluid communication with the outlet.

The valves may be mechanically coupled to one another such that they alter their states of fluid connectivity in tandem with each other.

BRIEF DESCRIPTION OF THE DRAWINGS

In order to understand the invention and to see how it may be carried out in practice, embodiments will now be described, by way of non-limiting examples only, with reference to the accompanying drawings, in which.

DETAILED DESCRIPTION OF EMBODIMENTS

Figure 1:
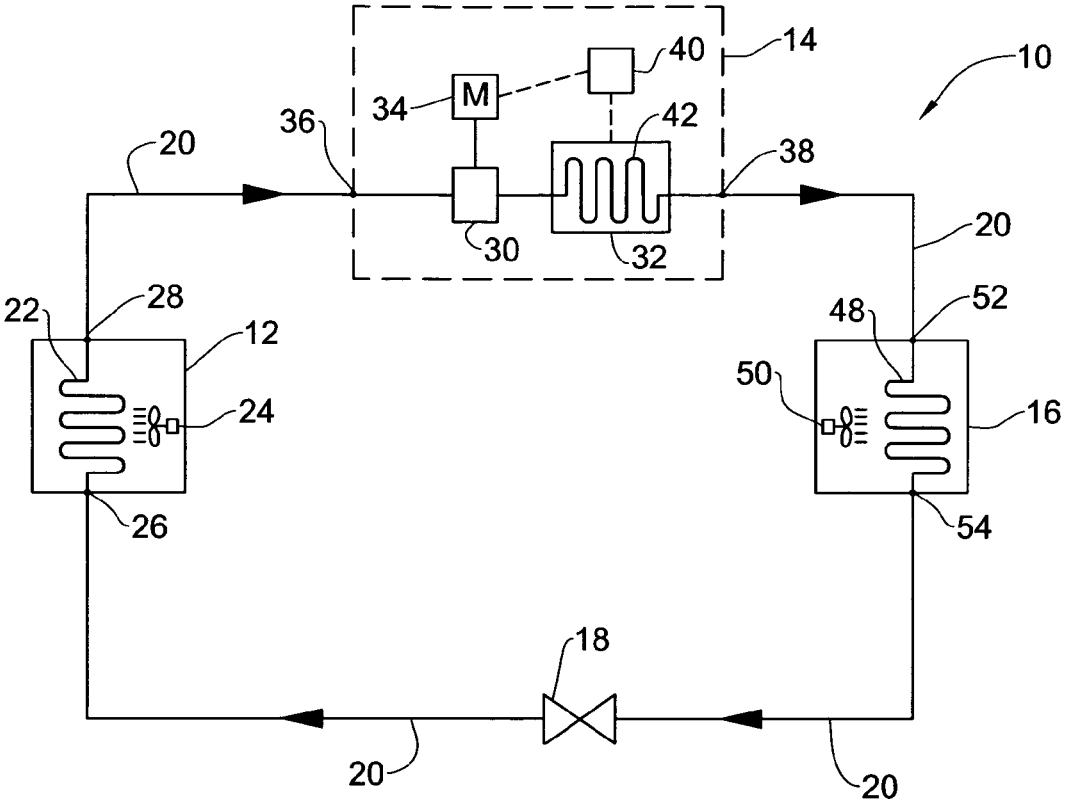
FIG. 1 is a schematic illustration of an air-conditioning system according to the present invention.

As illustrated in FIG. 1, there is provided an air-conditioning system, constituting a temperature control system, which is generally indicated at 10. The system 10 comprises an evaporator unit 12, and compressor unit 14, a condenser unit 16, and a metering device 18. The system 10 further comprises a refrigerant line 20, which is configured to carry refrigerant among the above-listed components of the system 10. The air-conditioning system 10 is configured to operate a vapor-configuration refrigeration cycle in order to provide cooling via the evaporator unit 12.

The evaporator unit 12 may be designed similar to evaporator units which are typically provided for use in air-conditioning systems. As such, it comprises an evaporator coil 22, disposed so as to be in fluid communication with the refrigerant line 20, and a fan 24, or other similar forced air mechanism, designed to force ambient air of the space to be cooled over the evaporator coil. The evaporator unit 12 is designed such that refrigerant which enters the evaporator coil 22 at an entrance 26 thereof in a liquid state exits the evaporator coil at an exit 28 thereof in a gaseous state.

The compressor unit 14 is disposed downstream of the evaporator unit 12, such that it receives refrigerant in a gaseous state therefrom, and is designed such that refrigerant which enters at an entrance 36 thereof in a gaseous state exits at an exit 38 thereof in a gaseous state at a higher pressure and temperature. It comprises a mechanical compressor 30, which may be which may be designed similar to mechanical compressors typically provided for use in air-conditioning systems, and a solar collector 32 connected thereto. The mechanical compressor 30 and solar collector 32 are arranged such that refrigerant enters the solar collector after it has passed through the mechanical compressor. The compressor unit 14 further comprises a controller 40, configured to control the operation thereof, as will be explained below.

The mechanical compressor 30 is configured to raise the pressure, and thus the temperature, of the gaseous refrigerant. It is provided with a motor 34 to drive its operation. The motor 34 may include a variable-frequency drive, which is designed to vary the speed of the motor 34, such that the compressor may work at a partial load, for example in response to a decreased cooling demand. Such an arrangement may be sold under the "Inverter" tag.

The solar collector 32 comprises a solar coil 42 constituting a refrigerant-carrying conduit, designed to be in fluid communication with and receive compressed refrigerant from the mechanical compressor 30. The solar coil 42 is provided so as to be exposed to solar radiation, thereby increasing the temperature of the gaseous refrigerant. The solar collector 32 may further comprise any arrangement to increase the efficiency thereof, including, but not limited to, solar reflectors, vacuum tubes surrounding the solar coil 42, a fin-tube arrangement, etc.

Figure 2:
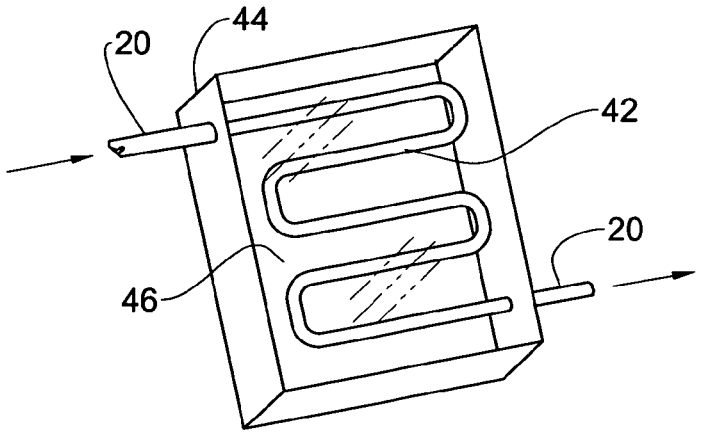
FIG. 2 is a perspective view of a solar collector for use with the air-conditioning system illustrated in FIG. 1.

As illustrated in FIG. 2, the solar collector 32 further comprises an enclosure 44 containing the solar coil 42 therewithin. The enclosure 44 comprises a radiation-facing side 46, which is designed for facing the sun when the system 10 is installed, and which is designed to allow the maximum amount of solar radiation, or the maximum amount of predetermined frequencies of solar radiation (for example infrared), to pass therethrough. The enclosure 44 may be evacuated, i.e., once the solar coil 42 and any other solid components are installed therein, a vacuum may be produced in the remaining space, or filled with an inert gas, or any other transparent insulating substance. This reduces heat loss from the solar coil 42 to the atmosphere surrounding the enclosure 44. The direction of refrigerant flow is indicated by arrows in FIG. 2.

The compressor unit 14 may comprise one or more sensors (not illustrated) for determining the state thereof during operation of the system 10. The outputs of these sensors may be used by the controller 40 to determine how to control operation of the compressor unit 14, as will be explained below.

The compressor unit may be provided with one or more solar-sensitive modules configured to measure the degree (i.e., intensity, etc.) of solar radiation which is available to or impinging upon the solar collector 32. This may be accomplished by any desired means, for example by providing photovoltaic cells. The solar-sensitive modules may be configured for detecting and distinguishing between different frequencies of solar radiation, in particular infrared radiation. The solar-sensitive modules may be disposed adjacent the solar collector 32, or behind the enclosure 44 thereof. The controller may determine the amount of solar energy which is available for contributed to the system based on the degree of solar radiation measured by the solar-sensitive modules. For example, the solar radiation measured may be multiplied by a factor equal to the amount by which the area of the solar coil 42 exceeds the total area of photo-sensitive material in the modules.

In addition to or alternatively to the above, temperature and/or pressure sensors may be disposed at the entrance to and exits from the solar coil 42. The controller 40 may use the temperatures and/or pressures measured at these points during operation of the system 10, together with other factors, such as type of refrigerant, etc., to determine the amount of the contribution of solar energy during use. The controller 40 may be configured for using these measurements together with those of the solar-sensitive modules, e.g., for performing real-time verifications of the results of each set of measurements.

In addition, other sensors may be provided for measuring usage parameters of the compressor unit 14 and or the entire air-conditioning system. These sensors may be provided for any desired use, for example for feedback control to the various elements of the system.

As mentioned, the compressor unit 14 is designed to increase the pressure and temperature of gaseous refrigerant passing therethrough. In use, the controller determines the desired pressure/temperature at which the refrigerant should exit the compressor unit 14, for example based on the cooling demand. It thus determines the contribution of solar energy which will be provided via the solar collector 32. Once this has been determined, the controller 40 operates the mechanical compressor 30 to provide the additional energy required to meet the cooling demand.

For example, if the motor 34 of the mechanical compressor 30 is provided with a variable-speed drive, it may cause the motor to operate at a highly reduced speed compared to that which would be necessary to meet the cooling load in the absence of the solar collector 32. In the absence of any sunlight, the compressor may operate as usual.

The condenser unit 16 may be designed similar to condenser units which are typically provided for use in air-conditioning systems. As such, it comprises a condenser coil 48, disposed so as to be in fluid communication with the refrigerant line 20, and a fan 50, or other similar forced air mechanism, designed to force air over the condenser coil. The condenser unit 16 is designed such that refrigerant which enters the condenser coil 48 at an entrance 52 thereof in a gaseous state exits the condenser coil at an exit 54 thereof in a liquid state.

The metering device 18 may be designed similar to metering devices which are typically provided for use in air-conditioning systems. It may be provided as a thermal (or thermostatic) expansion valve, which is designed to control the amount of refrigerant that flows from the condenser unit 16 to the evaporator unit 12. In addition, the pressure of the refrigerant drops as it traverses the metering device 18, which contributes to increased efficiency of the air-conditioning system 10.

Figure 3:
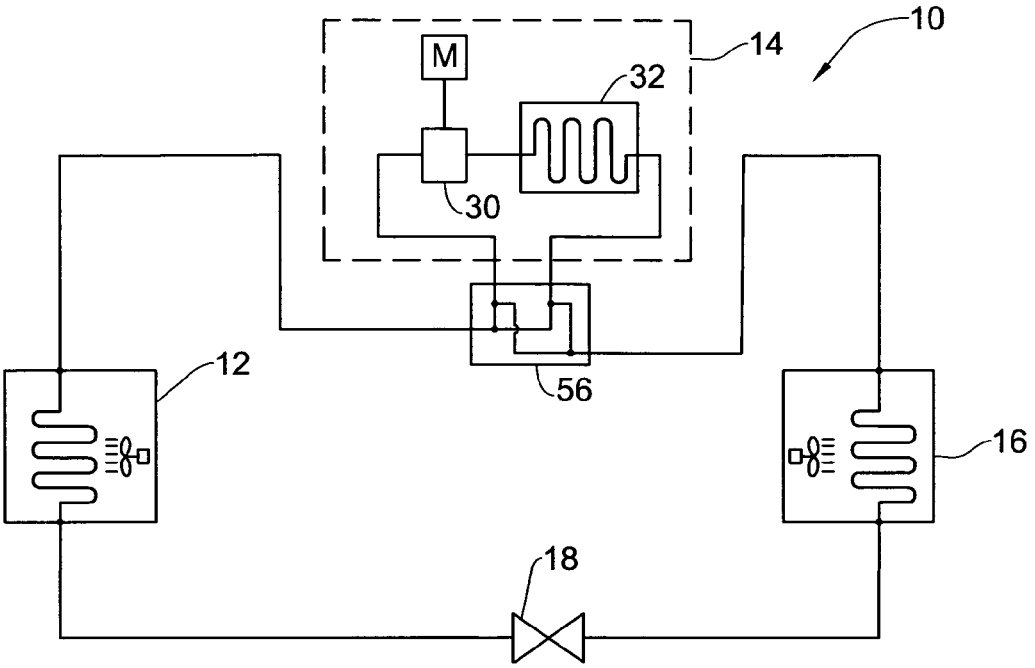
FIG. 3 is a schematic illustration of another example of an air-conditioning system according to the present invention.

As illustrated in FIG. 3, the air-conditioning system 10 described above may be used as a heat pump, such that refrigerant is provided to the evaporator unit 12 at a temperature which is higher than that of the space to be heated. Thus, when ambient is forced over it, it is heated. In order to operate thusly, the direction of flow needs to be reversed, except that it must pass through the mechanical compressor 30, and optionally the compressor unit 14, in the same direction as during cooling. For such a use, a reversing valve 56 is provided. The reversing valve 56 may be designed similar to reversing valves which are typically provided for use in air-conditioning systems.

Figure 4A:
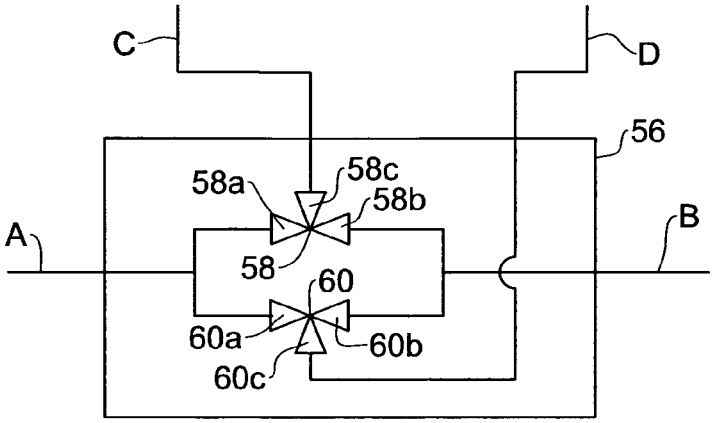
FIG. 4A is a schematic illustration of a reversing valve for use with the air-conditioning system illustrated in FIG. 3.

Alternatively, as illustrated in FIG. 4A, the reversing valve 56 may comprise two separate three-way valves: an inlet valve 58, which serves as an inlet to the compressor unit 14, and an outlet valve 60, which serves as an outlet to the compressor unit. Each of the inlet and outlet valve 58, 60 comprises three ports (an evaporator-side port 58a, 60a, each connected to the evaporator unit 12 via a first supply connection A; a condenser-side port 58b, 60b, each connected to the condenser unit 16 via a second supply connection B, and a compressor-side port 58c, 60c, connected, respectively, to the inlet of the mechanical compressor 30 via C and the outlet of the solar unit 32 via D), two of which may be brought into fluid communication with each other, while the third acts as a stopper.

Figure 4B:
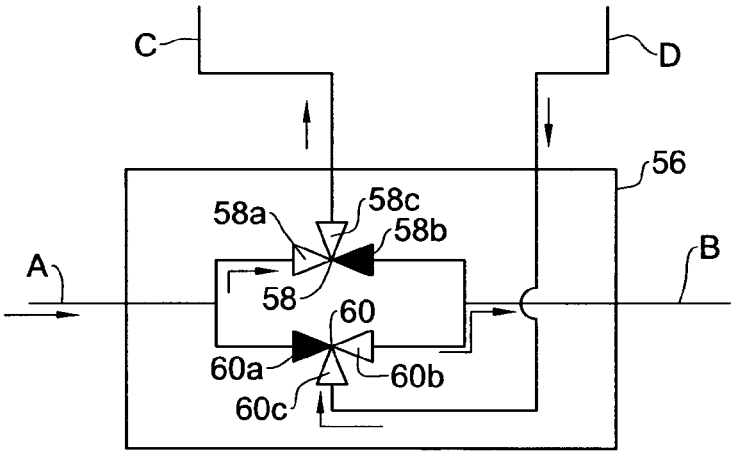
FIGS. 4B and 4C schematically illustrates operation of the reversing valve illustrated in FIG. 4A, in cooling and heating modes of operation, respectively.

During use to provide cooling via the evaporator unit 12, as illustrated in FIG. 4B, the inlet valve 58 is positioned such that the evaporator-side port 58a and compressor-side port 58c thereof are in fluid communication with each other, and the outlet valve 60 is positioned such that the condenser-side port 60b and the compressor-side port 60c thereof are in fluid communication with each other. The condenser-side port 58b of the inlet valve 58 and the evaporator-side port 60a of the outlet valve 60 act as stoppers. Refrigerant from the evaporator unit 12 flows via the first supply connection A through the evaporator-side port 58a of the inlet valve 58, and exits via the compressor-side port 58c thereof, from where it enters the mechanical compressor 30. Refrigerant from the solar collector 32 flows through the compressor-side port 60c of the outlet valve 60, and exits via the second supply connection B through the condenser-side port 60b thereof, from where it enters the condenser unit 16. The direction of refrigerant flow is indicated in FIG. 4B by arrows.

Figure 4C:
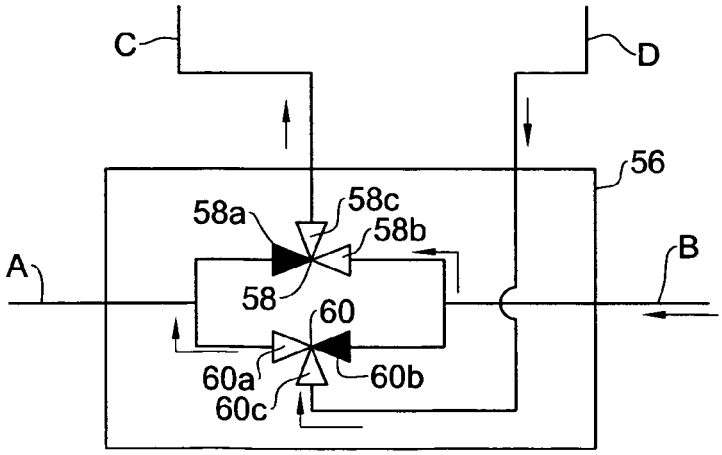

During use to provide heating via the evaporator unit 12, as illustrated in FIG. 4C, the inlet valve 58 is positioned such that the condenser-side port 58b and compressor-side port 58c thereof are in fluid communication with each other, and the outlet valve 60 is positioned such that the evaporator-side port 60a and the compressor-side port 60c thereof are in fluid communication with each other. The evaporator-side port 58a of the inlet valve 58 and the condenser-side port 60b of the outlet valve 60 act as stoppers. Refrigerant from the condenser unit 16 flows via the second supply connection B through the condenser-side port 58b of the inlet valve 58, and exits via the compressor-side port 58c thereof, from where it enters the mechanical compressor 30. Refrigerant from the solar collector 32 flows through the compressor-side port 60c of the outlet valve 60, and exits via the first supply connection A through the evaporator-side port 60a thereof, from where it enters the condenser unit 16. The direction of refrigerant flow is indicated in FIG. 4C by arrows.

It will be appreciated that although the reversing valve 56 is described as being positioned between the evaporator unit 12 and compressor unit 14 on a first side, and the compressor unit and condenser unit 16 on a second side (ensuring that refrigerant flow across the compressor unit is the same for all types of operations), it may be positioned between the mechanical compressor 30 and solar unit 32 on the second side (only ensuring that refrigerant flow across the mechanical compressor is the same for all types of operations), such that refrigerant is heated by solar radiation before being mechanically compressed.

The inlet and outlet valves 58, 60 may be mechanically coupled to one another in order ensure that they alter their states of fluid connectivity (i.e., which ports are in fluid communication) in tandem, so as to prevent a situation where they are each positioned to operate in a different mode, which could lead to undesired performance of the air-conditioning system 10 and/or damage to components thereof.

Figure 5:
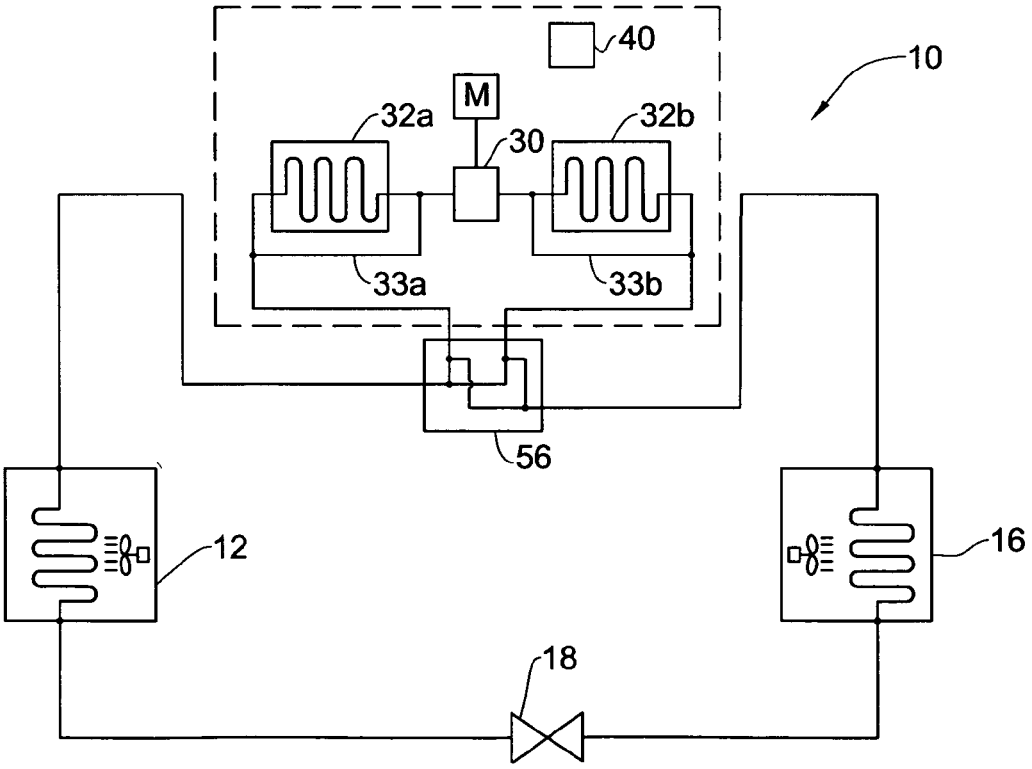
FIG. 5 is a schematic illustration of a further example of an air-conditioning system according to the present invention.

According to a modification, as illustrated in FIG. 5, the compressor unit 14 may comprise upstream and downstream solar collectors 32a, 32b. Bypass lines 33a, 33b are provided, each being associated with one of the solar collectors 32a, 32b. Appropriate valves (e.g., three-way valves, non-return valves, etc.; not illustrated) are provided at ends of each of the bypass lines 33a, 33b in order to selectively route refrigerant through the solar collector 32a, 32b or bypassing it. The controller 40 is configured to operate the valves in order to properly route the refrigerant.

In use to provide cooling via the evaporator unit 12, the valves of the bypass line 33a associated with the upstream solar collector 32a are operative to route refrigerant through the upstream solar collector, and the valves of the bypass line 33b associated with the downstream solar collector 32b are operative to route refrigerant to bypass the downstream solar collector. Thus, refrigerant is only heated before it enters the compressor.

When there is no sunlight impinging on the upstream solar collector 32a, or if the measured temperature thereof is lower than that of the refrigerant, the valves may be operative to route refrigerant through the bypass line 33a associated with the upstream solar collector, such that the compressor unit 14 operates as a regular compressor.

In use to provide heating via the evaporator unit 12, the valves of the bypass line 33a associated with the upstream solar collector 32a are operative to route refrigerant to bypass the upstream solar collector, and the valves of the both bypass lines 33a, 33b are operative to route refrigerant through their respective solar collectors 32a, 32b. Thus, refrigerant is heated before it enters the compressor, and again once it leaves.

When there is no sunlight impinging on the solar collectors 32a, 32b, or if the measured temperature thereof is lower than that of the refrigerant, the valves may be operative to route refrigerant through the bypass lines 33a, 33b, such that the compressor unit 14 operates as a regular compressor.

Figure 6:
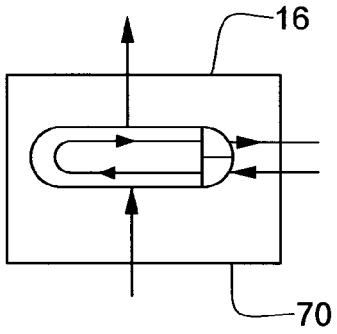
FIG. 6 is a schematic illustration of a modification of a condenser unit of the air-conditioning of the present invention.

According to another modification, as illustrated in FIG. 6, the condenser unit 16 may comprise a heat exchanger 70 connected to a source of water. (It will be appreciated that although the heat exchanger 70 is represented in FIG. 6 with the symbol for a shell and tube heat exchanger, any appropriate heat exchanger may be provided.) Thus, the air-conditioning system 10, and specifically the condenser unit 16, may serve as a part of a water heating system.

The solar collector 32 may comprise an arrangement designed for increasing absorption of heat from solar radiation impinging on the solar collector 32 and transferring it to the solar coil 42. For example, it may comprise a fin-tube arrangement, wherein the solar coil 42 constitutes the tube thereof.

Figure 7A:
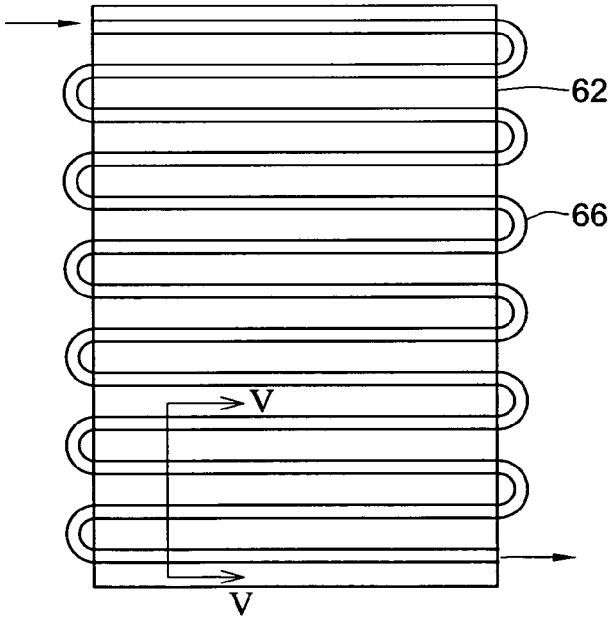
FIG. 7A illustrates a heat-sink for use with the solar collector illustrated in FIG. 2.
Figure 7B:
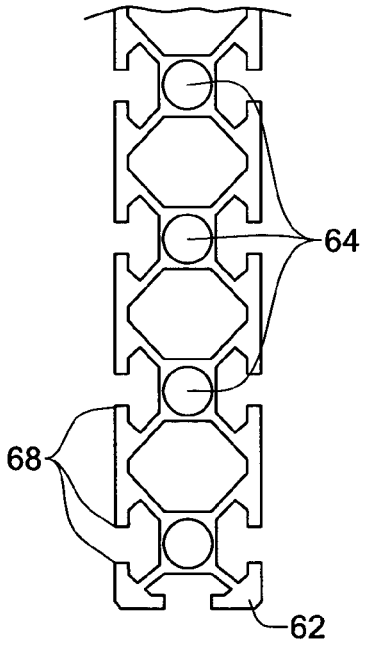
FIG. 7B is a cross-sectional view taken along line V-V in FIG. 7A.

Alternatively, as illustrated in FIGS. 7A and 7B, it may comprise a heat-sink 62, for example made of extruded aluminum. The portions of the solar coil 42 passing through the heat-sink 62 may be disposed within tubes 64 formed within the heat-sink, or the tubes 64 may constitute those portions of the solar coil (i.e., the solar collector 32 may be designed such that refrigerant passes directly through the heat-sink, and is directed to an adjacent tube by a semi-circular coil 66 attached to the end of each tube. Projections 68 are provided to increase the area for impingement of incident solar radiation.

The surface of the heat-sink 62 may be designed to lower its reflectivity. For example, it may be painted a dark color, coated with a low- or non-reflective materiel such as matte paint, etc.

Although one embodiment of the heat-sink 62 has been illustrated, it will be appreciated that any appropriate shape which is configured for increasing absorption of heat from solar radiation impinging on the solar collector 32 and transferring it to the solar coil 42 may be provided. For example, the heat-sink 62 may be provided as a flat slab of appropriate material with through-going bores constituting (or allow passage therethrough of) portions of the solar coil 42.

It will be appreciated that although the above has been described in connection with a solar collector, any thermal collector may be substituted therefore without departing from the spirit and scope of the present invention, mutatis mutandis. For example, the air-conditioning system may be adapted for automotive use, with the thermal collector being configured for capturing and utilizing waste heat from the operation of the automobile for increasing the temperature of the refrigerant. Appropriate sensors may optionally be provided for determining the amount of thermal energy thus contributed, or expected to be thus contributed. Other examples include thermal collectors which are configured for capturing and utilizing waste heat from industrial applications, including, but not limited to, ovens, laundry dryers, etc.

Those skilled in the art to which this invention pertains will readily appreciate that numerous changes, variations and modifications can be made without departing from the scope to of the invention mutatis mutandis.

The invention claimed is:

1. A temperature control system, *the system* comprising a closed refrigerant circuit[,] comprising:

an evaporator unit configured for absorbing heat via the refrigerant, thereby evaporating [it] *the refrigerant*;

a compressor unit comprising:

a mechanical compressor configured for increasing the pressure of the refrigerant within the circuit, [and]

a thermal collector configured for utilizing an external heat source to increase the temperature of the refrigerant within the circuit; [and]

a condenser unit configured for rejecting heat from the refrigerant *within the circuit*, thereby liquefying [it] *the refrigerant, said condenser unit being the first unit downstream the thermal collector that rejects heat from the refrigerant*.

2. The temperature control system according to claim 1, wherein said thermal collector comprises a solar collector configured for capturing heat from incident solar radiation.

3. The temperature control system according to claim 2, wherein said solar collector comprises a refrigerant-carrying conduit within an *evacuated* enclosure, a radiation-facing side of the enclosure comprising a transparent material.

[4. The temperature control system according to claim 3, wherein said enclosure is evacuated.]

[5. The temperature control system according to claim 3, wherein said solar collector further comprises a heat-sink associated with said refrigerant-carrying conduit, said heat-sink being configured to absorb solar energy and transfer it to said refrigerant-carrying conduit.]

[6. The temperature control system according to claim 5, wherein said heat-sink is formed with projections extending radially from said refrigerant-carrying conduit.]

[7. The temperature control system according to claim 5, wherein said heat-sink is made of an extruded material.]

[8. The temperature control system according to claim 5, wherein said heat-sink is made of a metal.]

[9. The temperature control system according to claim 5, wherein at least radiation-facing surfaces of said heat-sink are designed to lower reflectivity thereof.]

10. The temperature control system according to claim [1] *18*, further comprising:

temperature sensors disposed to measure the temperature of the refrigerant upon entering and exiting said thermal collector; and

[a] *the* controller configured to [determine an expected temperature increase of the refrigerant in the thermal collector based on the temperature measured by said temperature sensors, and to] control operation of said mechanical compressor *by causing the variable-frequency drive to vary the speed of the mechanical compressor* at least based on [said expected temperature increase] *temperature of the refrigerant measured by the temperature sensors.*

[11. The temperature control system according to claim 10, wherein said compressor unit comprises a variable-frequency drive to vary the speed of the mechanical compressor.]

[12. The temperature control unit according to claim 1, configured to operate a vapor-compression refrigeration cycle.]

13. The temperature control system according to claim 1, further comprising a metering device downstream of said condenser unit configured for regulating flow of liquid refrigerant.

[14. The temperature control system according to claim 1, being a split-system air conditioning system.]

15. The temperature control system according to claim 1, further comprising a reversing valve configured to cause said refrigerant to flow in a reverse direction, thereby enabling said evaporator unit to reject heat from the refrigerant, and said condenser unit to absorb heat to the refrigerant.

[16. The temperature control system according to claim 1, wherein said condenser unit constitutes a portion of a water heating system, water heater being configured to utilize the heat rejected from the refrigerant to heat water.]

*17. A temperature control system, the system comprising a closed refrigerant circuit comprising:*

*an evaporator unit configured for absorbing heat via the refrigerant, thereby evaporating the refrigerant;*

*a compressor unit comprising:*

*a mechanical compressor configured for increasing the pressure of the refrigerant within the circuit,*

*a thermal collector arranged downstream of the mechanical compressor, the thermal collector being configured for utilizing an external heat source to increase the temperature of the refrigerant within the circuit;*

*a condenser unit configured for rejecting heat from the refrigerant within the circuit, thereby liquefying the refrigerant; and*

*a reversing valve configured to cause said refrigerant to flow in a reverse direction, thereby enabling said evaporator unit to reject heat from the refrigerant and said condenser unit to absorb heat to the refrigerant, wherein the reversing valve is configured to maintain the thermal collector downstream of the mechanical compressor when the refrigerant is caused to flow in said reverse direction.*

*18. The temperature control system according to claim 1, the temperature control system being configured to meet a cooling load, wherein the mechanical compressor comprises a variable-frequency drive configured to vary speed of the mechanical compressor,*

*the closed refrigerant circuit further comprising:*

*a controller configured to control operation of the mechanical compressor at least by causing the variable-frequency drive to vary the speed of the mechanical compressor,*

*wherein the system is configured to operate the mechanical compressor at a variable speed based on the cooling load and the temperature of the refrigerant.*

*19. The temperature control system according to claim 17, the temperature control system being configured to meet a cooling load,*

*wherein the mechanical compressor comprises a variable-frequency drive configured to vary speed of the mechanical compressor, and*

*wherein the system is configured to operate the mechanical compressor at a variable speed based on the cooling load and the temperature of the refrigerant.*

* * * * *